May 25, 1926.
M. R. PRICE
AUTOMOBILE TIRE
Filed Dec. 3, 1923
1,585,875
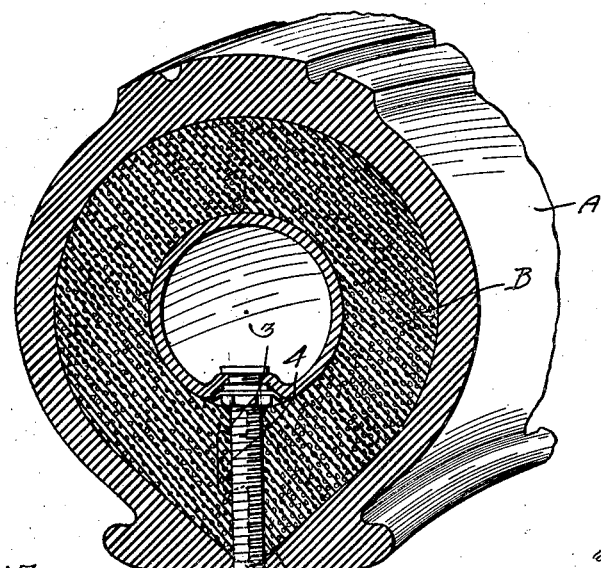
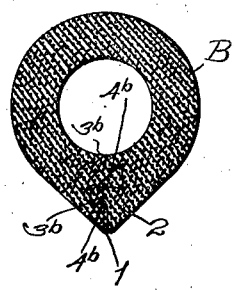
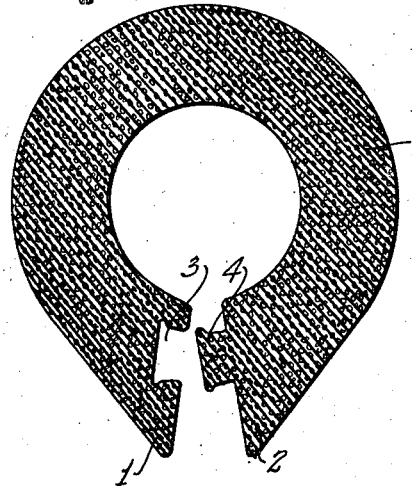
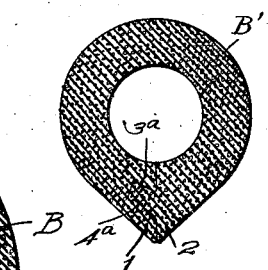
INVENTOR
M. R. Price.
BY Ralph Kalish
ATTORNEY Patented May 25, 1926.

1,585,875

UNITED STATES PATENT OFFICE.

MANLEY R. PRICE, OF CLEVELAND, OHIO, ASSIGNOR TO H. THURMAN CRISP, OF ST. LOUIS, MISSOURI.

AUTOMOBILE TIRE.

Application filed December 3, 1923. Serial No. 678,183.

This invention relates to a certain new and useful improvement in automobile tires.

The usual automobile tire of pneumatic type as today generally constructed comprises an outer casing and an inner relatively thin wall inflatable tube, and punctures and blow-outs are a frequent source of inconvenience and expense and often the cause of accidents. My present invention has for its chief object the provision of a so-called casing-lining which will efficiently function in the resiliency of the tire and, at the same time, in obviating the inconvenience, expense, and accidents usually incident to and following present day tire punctures and blow-outs.

With the above and other objects in view, my present invention resides in the novel features of form, construction, arrangement, and combination of parts hereinafter described and pointed out in the claim.

In the accompanying drawings,

Figure 1 is a transverse sectional view of a casing and lining of an automobile tire embodying my invention;

Figure 2 is a transverse sectional view of the lining with its circumferential edges in open spaced relation; and Figures 3 and 4 are transverse sectional views of slightly modified forms of tire-casing linings embodying my invention shown with their circumferential ends in abutting closed and interlocking relation.

Referring now more in detail and by reference characters to the drawings, A designates a tire casing of standard form and construction. Adapted to fit within casing A, is a lining B of my invention.

The lining B is constructed wholly of sponge rubber and may be described as being in the form of an annular tube circumferentially split at its inner portion and thereby provided with the so-called circumferential edges 1 and 2.

Tube B is externally of such diametrical and transverse dimensions as to snugly fit within the particular casing A. In the present instance, casing A is approximately three inches in diameter, and the present day inner thin-wall inflatable tube would consequently have an internal diameter when inflated of also approximately three inches. The lining B, however, has a greatly reduced internal diameter relatively to the internal diameter of casing A, the lining B having, in the present instance, an internal diameter of but one and a half inches. And since tube B is non-expansible and is adapted, as stated, to snugly fit the casing A, it follows that the sponge rubber wall of tube or lining B is relatively thick and massive, having, also in the present instance, a thickness of approximately three-fourths of an inch. Internally, tube or lining B is of regular, uniform diameter and is adapted to accommodate a hard-rubber or other core or a present standard inner thin-wall inflatable tube of corresponding diametrical dimensions. Externally, however, tube or lining B varies in diametrical or transverse thickness at and adjacent its edges 1 and 2 to conform to the usual casing A, the wall of tube or lining B being radially thickened and substantially wedge-shaped at its edges 1 and 2 to fit the similarly shaped space between the bead or circumferential edge portions of the casing A.

At its one edge 1, the tube or lining B is annularly formed with a recess or groove 3 counter-channeled or enlarged at its base, and at its other edge 2, the tube or lining B is annularly formed with a continuous tongue 4 enlarged or headed at its free edge in the nature of a headed stud and of form and dimensions to fit within the recess or groove 3 when the edges 1 and 2 are butted together, whereby the edges 1 and 2 of tube or lining B are adapted for interlocking engagement.

The annular recess or groove 3 and the annular tongue 4 are concentrically disposed and circumferentially parallel with the diametrical axis of the tube or lining B, as shown in Figures 1 and 2. Preferably, however, as in Figure 4, the groove $3^a$ and co-operating tongue $4^a$ are circumferentially obliquely disposed to the diametrical axis of the lining B', under the interlocking engagement between which the edges of the lining B are efficiently held and secured tightly together when the lining is under compression and in the absence even of an internal expanding solid or inflatable core, in the obtaining of which result or effect the narrow neck and wider base construction of the groove and corresponding narrow stem and wider head form of the tongue assists most materially; and, as a further modification each of the edges 1 and 2 of the lining $B^2$ may be formed with an annular groove 3ᵇ and annular tongue 4ᵇ for interfitting or interlocking co-operation with a similar or companion groove and tongue on the opposite end.

In either of such forms, the circumferential edges 1 and 2 of lining or tube B are adapted to form an interlocking butt-joint when the lining B is fitted within its enclosing casing A, and when so fitted in its casing A, the lining B most efficiently functions in the resiliency of the tire. In addition, the tube B forms practically a non-puncturable lining for the casing, the cells of its relatively massive sponge-rubber wall under compression readily compensating for holes or cuts caused by nails or other foreign matter cutting through the casing A, and at the same time its abutting interlocked edges 1 and 2 efficiently function both in the presence and absence of compression in retaining the core or bore of the lining.

My new tire-casing lining may be readily and relatively inexpensively molded or otherwise manufactured and is exceedingly efficient in the performance of its intended functions.

Having thus described my invention, what I claim and desire to secure by Letters Patent is:

An automobile-casing lining comprising an annular circumferentially split thick wall sponge rubber tube diametrically thickened and radially expanded at its circumferential edges, said tube being provided in one of its said edges with an annular groove obliquely disposed both to the edge face and to the diametrical axis of the tube and counter-channeled and thereby of greater dimension at its base than at its neck and upon the opposite one of its said edges with an annular tongue also obliquely disposed both to the edge face and to the diametrical axis of the tube and correspondingly of greater dimension at its head than at its stem, said tongue being adapted for co-operative interlocking engagement with said groove for retaining the edges of the tube together when the tube is under compression either in the presence or absence of an internal tube-expanding core.

In testimony whereof, I have signed my name to this specification.

MANLEY R. PRICE.